United States Patent Office 3,764,289
Patented Oct. 9, 1973

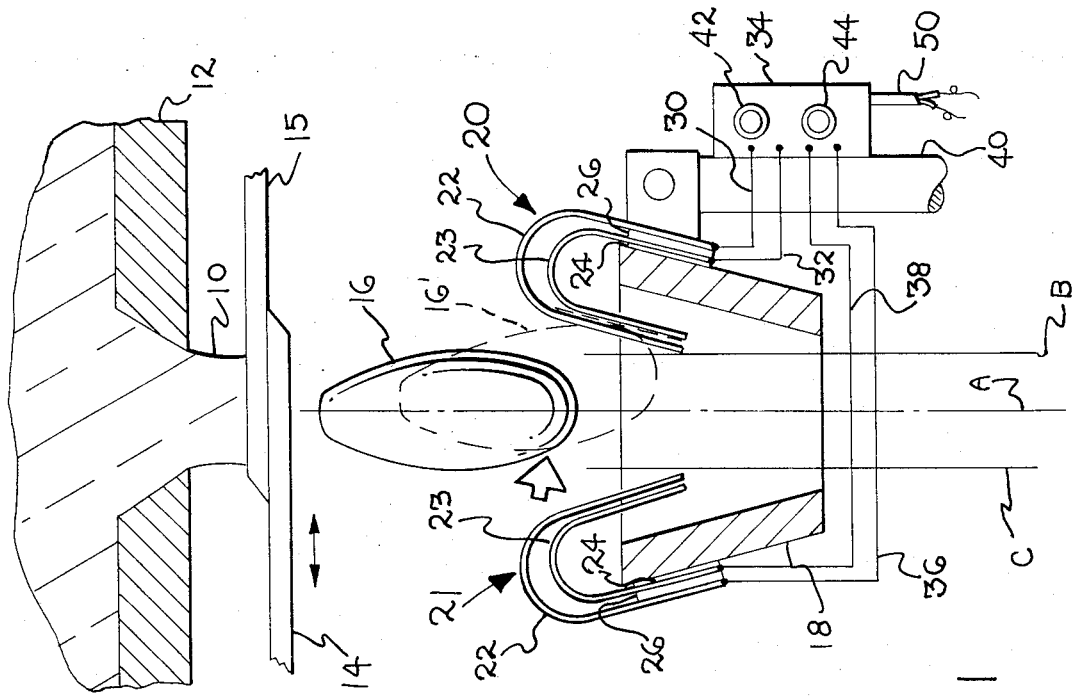
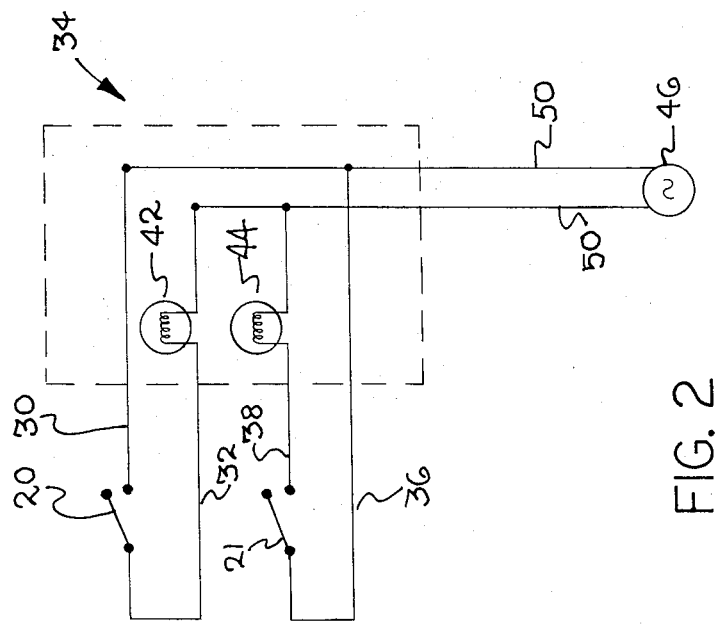

3,764,289
FALLING GOB DEVIATION INDICATOR
Andrew Ellsworth Brymer, Jr., Toledo, Ohio, assignor to Owens-Illinois, Inc.
Filed May 30, 1972, Ser. No. 258,098
Int. Cl. C03b 5/38
U.S. Cl. 65—304
3 Claims

ABSTRACT OF THE DISCLOSURE

Apparatus and method for indicating the deviation of a severed gob of glass from travel in a vertical plane. A guide funnel is positioned in the path of travel of a freely falling, severed glass gob to guide it to a work station. Two switches are positioned in diametrically opposed locations on the funnel. The switches are normally open and each is connected to an indicator light. If the severed gob deviates from a true vertical path through the guide funnel, the gob will close one switch or the other, causing the light associated therewith to flash and thus alert an operator as to the deviation in path.

BACKGROUND OF THE INVENTION

This invention generally relates to severing discrete gobs of glass for delivery into a glass forming machine. Specifically, this invention relates to schemes for indicating the deviation of a severed, freely falling glass gob from a true vertical plane. Most particularly, this invention relates to a switching arrangement, activated by a severed glass gob which has deviated from a true vertical plane, which alerts a glass forming machine operator as to the occurrence of the deviation.

In a typical "flow forming" operation to manufacture glass containers, discrete glass gobs are severed from a flowing stream of molten glass. This gob is allowed to fall freely for a short distance and then is intercepted for delivery to a glass forming machine such as the well known "IS" machine. A problem which frequently occurs is that the gob severing apparatus becomes somewhat misaligned or the glass temperature changes, resulting in a deviation of the falling gob from a true vertical plane. This causes difficulty in hitting the gob-intercepting equipment accurately and also problems in loading the gob into the forming machine. I have devised an inexpensive, rugged device for indicating the deviation of the gob from a true vertical plane.

SUMMARY OF THE INVENTION

My invention is an improvement in apparatus for severing discrete charges of molten glass from a supply of glass issuing from an orifice for gravity feed to glass forming equipment, the improvement comprising a means positioned below the plane of severance of the glass for indicating the movement of the severed charge in other than a vertical path of travel.

BRIEF DESCRIPTION OF THE DRAWINGS

FIG. 1 is a side elevational view, partially cut away, of the apparatus of the present invention; and
FIG. 2 is a schematic circuit diagram of the electrical connections of the apparatus of the present invention.

DETAILED DESCRIPTION OF THE DRAWINGS

In FIG. 1, a stream of molten glass 10 may be seen issuing from an orifice formed in the bottom of a glass forehearth 12. The glass stream 10 is severed by two opposed shear blades 14 and 15 which move in the direction indicated by the arrow under the blade 14. The movement of the blades 14 and 15 cuts the glass stream 10 into discrete molten glass gobs or charges 16. This operation is a part of the well known and commonly used "flow forming" process for making glass containers. The glass severing apparatus may be seen in detail in U.S. Pat. 2,680,937, but it is believed that those skilled in the art of glass container manufacture will need no explanation other than that contained herein. Normally, the severed gob 16 will fall downward in substantially a vertically plane, indicated as A in FIG. 1, and through an annular guide funnel 18 for delivery to the glass forming machinery. However, with sufficient frequency to make it a problem which must be dealt with, the gob 16 can fall in such a manner as to have a horizontal component of motion or be tipped such that the axis of symmetry deviates from a true vertical path. This may be caused by factors which include misalignment of the blades 14 and 15 or a thermal differential from side to side in the glass stream 10. This condition is undesirable since it causes erratic loading of the gob 16 into the glass forming machinery. The deviation of the gob 16 is generally in the direction of travel of the blades 14 and 15, which is to the right or left of the vertical line A of FIG. 1; only in extremely rare situations is the movement into or out of the plane of the paper in FIG. 1. In addition, the vertical path of travel which is desired is further defined by the lines B and C which delineate a cylinder of space through which a properly falling gob 16 will pass. It should be clear also that an oversize or "fat" gob would fall outside the lines B and C and give a warning. Thus, I have provided two diametrically opposed switches 20 and 21 mounted on the guide funnel 18 to indicate horizontal movement of the gob 16. Each of the switches 20 and 21 have an outer, substantially U-shaped, contact arm 22. The contact arms 22 are made of an electrically conductive, springy material, such as steel shim stock, bent into the proper shape. The contact arms 22 are mounted such that one leg of the U projects into the opening through the funnel 18 and the other leg projects over the side of the funnel 18 for mounting purposes. A pair of inner, substantially U-shaped contact arms 23, having a width or spacing between legs less than the contact arms 22, are mounted inside the contact arms 22. The contact arms 23 are attached to the funnel 18 through insulating spacers 24. The contact arms 22 are held in a spaced apart relationship with the contact arms 23 by a pair of insulating spacers 26. The spacers 26 serve to firmly attach the contact arms 22 to the contact arms 23, thus allowing the contact arms 22 and 23 to function as a unit to define a normally open switch. The material of the contact arms 23 may be identical to that used for the contact arms 22, although the spring function of the contact arm 23 is not so important and the material thus could be rigid, rather than having spring properties. Suitable electrical wiring 30 and 32 respectively connects the contact arms 22 and 23 of the switch 20 to an indicator panel 34. Similarly, the contact arms 22 and 23 of the switch 21 are connected to the indicator panel 34 by suitable electrical wiring 36 and 38. In the embodiment shown, the indicator panel 34 is supported adjacent the funnel 18 by a mounting post 40 attached to the machine framework (not shown). However, the indicator panel 34 may be place in any location which could prove to be of maximum benefit to the bottle machine operator. A light 42 mounted on the panel 34 is connected to the switch 20 in series. A similar light 44 mounted on the panel 34 is connected to the switch 21 in series. While the lights 42 and 44 are shown as being vertically aligned, they could be horizontally aligned to give a more pictorial indication of deviation to one side. In addition, the lights 42 and 44 could be of different colors for faster recognition of one versus the other.

The wiring diagram of FIG. 2 illustrates the function of the switches 20 and 21. A source of electrical power 46, which is shown as an AC source, but could be a battery or DC source, is connected to the indicator panel 34 through suitable electrical wiring 50. The source of electrical power 46 is connected to the lights 42 and 44 in parallel. The switches 20 and 21 are shown as being open, which is their normal condition, since the contact arms 22 and 23 are separated by their difference in width and the insulating spacers 24 and 26. So long as the switches 20 and 21 are open, the lights 42 and 44 will be off, due to the series connection between the switches 20 and 21 and the lights 42 and 44. When the switch 20 is closed, the light 42 will be turned on, and when the switch 21 is closed, the light 44 will be turned on.

With this description in mind, the operation of the apparatus is as follows: Gobs 16 which are falling along the proper vertical line A do not touch the outer contact arms 22 during passage through the funnel 18. However, a gob 16 which falls improperly with a horizontal component of motion will strike one of the two contact arms 22. In FIG. 1, the dotted gob 16' is shown as such an improper gob. The gob 16' has struck the outer contact arm 22 of the switch 20 and forced it into contact with the inner contact arm 23 of the switch 20, as indicated by the dotted position of the contact arm 22 shown in FIG. 1. This completes the circuit to the light 42 which will remain on so long as the gob 16' keeps the contact arm 22 depressed. When the gob 16' falls through the funnel 18, the spring qualities of the contact arm 22 will restore it to its original position, thereby opening the circuit to the light 42 and causing the light 42 to go out. It should be clear that, had the gob 16' been inclined to the left relative to the vertical line A in FIG. 1, the switch 21 would have been closed and the light 44 would have flashed on. This sequence serves an extremely valuable purpose, since the flashing lights quickly attract the operator's attention, thus allowing early detection and correction of an improper condition. While only one funnel 18 has been shown, those skilled in the glassmaking art realize that the conventional practice today is to have at least two funnels present at each machine station. That is, in most cases, two gobs 16 are cut simultaneously for delivery. This, of course, will require the use of two switches 20 and 21 on each funnel 18 used, as well as additional lights, such as 42 and 44, on the indicator panel 34 for the additional switches. Under some conditions, a particular gob shearing apparatus may tend to invariably deflect a gob 16 in only one direction. In such a case, only one of the switches 20 or 21 would be required, depending on the invariable direction of deviation. However, this condition is unusual, and in most cases the use of both switches 20 and 21 is highly desirable.

What I claim is:

1. In apparatus for severing gobs of molten glass from glass flowing downwardly through an orifice wherein the glass is severed by the movement of a pair of horizontally reciprocating shear blades and a guide funnel is mounted beneath the plane of the shears; the improvement comprising a pair of spaced apart, normally open switches mounted adjacent the upper end of said funnel and extending within the diameter of said funnel at a radial position outside a cylinder of space defined by the path of travel of a properly oriented falling gob, and signal means connected to said switches for indicating the closing of said switches by contact therewith by a falling gob of glass, thereby indicating the lateral deviation of a glass gob from a vertical path extending axially of the funnel.

2. The apparatus of claim 1, wherein said signal means comprises, in combination: a pair of signal lights; a source of electrical power; and circuit means for connecting said signal lights to said source of electrical power in parallel and for individually connecting said pair of switches in series with said signal lights, whereby closing one of said switches will energize one of said signal lights and closing the other one of said switches will energize the other one of said signal lights.

3. The apparatus of claim 1, wherein each of said pair of switches comprises, in combination: an outer, substantially U-shaped contact arm having one leg thereof projecting into said funnel; an inner, substantially U-shaped contact arm, having a smaller width than said outer contact arm, positioned inside said outer contact arm such that no part of said inner and outer contact arms are normally in contact, said inner contact arm having one leg thereof projecting into said funnel; and electrically insulating spacer means for connecting together the legs of said inner and outer contact arms which do not project into said funnel, whereby said inner and outer contact arms function as a unit to define a normally open switch.

References Cited
UNITED STATES PATENTS

| 1,680,391 | 8/1928 | Peiler | 65—304 |
|---|---|---|---|
| 1,820,508 | 8/1931 | Sylvester | 65—164 |
| 2,306,789 | 12/1942 | McNamara | 65—164 X |
| 3,192,027 | 6/1965 | Wilhelm | 65—164 X |

ROBERT L. LINDSAY, Jr., Primary Examiner

U.S. Cl. X.R.

65—164, 334